United States Patent
Marchand et al.

(10) Patent No.: US 6,947,532 B1
(45) Date of Patent: *Sep. 20, 2005

(54) FRAUD DETECTION BASED ON CALL ATTEMPT VELOCITY ON ORIGINATING NUMBER

(75) Inventors: Dean C. Marchand, Brighton, CO (US); Erin C. Jackman, Denver, CO (US)

(73) Assignee: MCI, Inc., Ashburn, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/575,469

(22) Filed: May 22, 2000

(51) Int. Cl.[7] .................. H04M 15/00; H04M 17/00; H04M 3/00

(52) U.S. Cl. .................. 379/114.14; 379/127.02; 379/145; 379/189; 379/188

(58) Field of Search ............ 379/114.01, 114.03, 379/114.04, 114.14, 114.15, 114.17, 114.18, 114.19, 114.2, 127.01, 127.02, 127.03, 127.04, 128, 129, 133, 145, 188, 189, 190, 191, 192

(56) References Cited

U.S. PATENT DOCUMENTS

| | | | |
|---|---|---|---|
| 5,524,145 A | | 6/1996 | Parker |
| 5,524,245 A | | 6/1996 | Zarrin et al. |
| 5,566,234 A | | 10/1996 | Reed et al. |
| 5,602,906 A | * | 2/1997 | Phelps ............... 379/114.01 |
| 5,768,354 A | * | 6/1998 | Lange et al. ............ 379/189 |
| 5,867,566 A | | 2/1999 | Hogan et al. |
| 5,875,236 A | * | 2/1999 | Jankowitz et al. ..... 379/114.01 |
| 5,937,043 A | | 8/1999 | He |
| 5,963,625 A | * | 10/1999 | Kawecki et al. ....... 379/114.01 |
| 6,195,422 B1 | | 2/2001 | Jones et al. |
| 6,208,720 B1 | | 3/2001 | Curtis et al. |
| 6,396,915 B1 | * | 5/2002 | Springer et al. ........... 379/145 |
| 6,418,212 B1 | * | 7/2002 | Harrison et al. .......... 379/189 |
| 6,516,056 B1 | * | 2/2003 | Justice et al. ............. 379/145 |

FOREIGN PATENT DOCUMENTS

| | | |
|---|---|---|
| EP | 0618713 | 10/1994 |
| EP | 0 805 580 A2 | 5/1997 |

* cited by examiner

Primary Examiner—Quoc Tran (57) ABSTRACT

A method of identifying fraud in a telecommunications system. The method includes receiving data related to a current call placed from an originating automatic number indicator (ANI), where the received data includes at least the originating ANI, a billing number and an identification code. A threshold number and a time interval corresponding to the identification code for the originating ANI are retrieved, for example, from a memory. In addition, billing numbers for prior calls from the originating ANI, if any, and corresponding indicia of the times of the calls are retrieved. A determination is made of whether the number of billing numbers used for the current and prior calls from the originating ANI over a prior period of time equal to or less than the time interval exceeds the threshold number. If the threshold number is exceeded, a fraud alert is generated.

22 Claims, 3 Drawing Sheets

FRAUD DETECTION BASED ON CALL ATTEMPT VELOCITY ON ORIGINATING NUMBER

BACKGROUND OF THE INVENTION

1. Technological Field

The invention relates to preventing fraudulent access to a telecommunications system. In particular, the invention relates to identifying fraudulent calls originating at a particular telephone number (an "originating automatic number indicator" or "originating ANI").

2. Description Of The Related Art

Fraud costs the telecommunications industry billions of dollars per year. There are many techniques used to perpetrate fraud. The fraud can be as simple as using a stolen credit card to charge a long distance call, or it can involve sophisticated looping techniques, such as repeatedly calling a private PBX system, finding the correct sequence to access an outside line (by trial and error or other hacking techniques) and then placing a costly long distance call through the PBX system. The telecommunications industry is involved in an intensive and ongoing effort to identify different types of fraud and then to develop and implement ways of preventing such fraud.

Fraud is more costly to certain telecommunications companies than others. For example, where a fraudulent call is directed at a company that owns the underlying telecommunications infrastructure, the cost of the call is less than the cost to an independent company that incurs access charges to the owner(s) of the infrastructure supporting the call, even if the call is fraudulent. In either case, however, the cost to the industry is significant.

Particular methods of fraud control and systems for implementing them are known in the industry. Fraud control may be divided conceptually into identifying a call that is likely to be fraudulent and responding after a call is identified as likely to be fraudulent. Methods of identifying calls that are likely to be fraudulent vary from the simple to the sophisticated and are generally directed at a particular type of fraudulent activity. For example, a call is likely to be fraudulent if it is made using a calling card that has been reported stolen by the owner.

A more sophisticated method and system of identifying fraudulent calls is described in U.S. Pat. No. 5,768,354, entitled "Fraud Evaluation And Reporting System and Method Thereof", which is owned by the assignee of the present invention. Fraudulent activity is identified in the '354 patent by monitoring a billing detail record created for each call. In the simple case, where the company's database shows that the billing number being used for a call has been reported lost, stolen, etc., the billing detail record includes a header designating it is a "bad billing number", the call is immediately identified fraudulent and an alert is generated in the system.

The '354 patent is directed at calls that require "special service", that is, which are placed through an operator or an automatic operation support system. Such calls generally require the caller to manually supply the billing number, such as by pressing numbers on a payphone, swiping the magnetic strip on a card or speaking with an operator. It may also require the caller to identify the category of billing product (such as credit card, calling card, or pre-paid phone card) for the billing number. The category of the billing product may alternatively be identified by the system by matching all or part of the billing number with billing numbers (or ranges of billing numbers) stored in an identification database, where the stored billing numbers are correlated with the category of billing product. The identification database may also correlate a billing number with the particular type of billing product for the category. For example, where the category of the billing number is identified as a credit card, the identification database may use the billing number to further identify the type of credit card, such as Visa, Master Card, American Express, etc.

The '354 patent also identifies fraudulent activity by monitoring use of a billing number over time. For example, where the number of domestic calls placed within a certain amount of time using the same billing number exceeds a threshold, an alert is generated. International calls are similarly handled, however, the threshold may be adjusted so that fewer calls within the time period generate an alert. In addition, the threshold may be further adjusted for calls to countries where a high percentage of fraudulent calls are directed. The thresholds may also be varied by the billing product. For example, fraudulent activity may be determined to be more likely to occur on a calling card than on a third party call; consequently, the threshold may be set lower for calling card products.

Once a call initiates an alert that the call might be fraudulent, additional activity may be taken to further examine whether the billing number is being used fraudulently, or steps may be taken to prevent further calls using the billing number. In the '354 patent, after an alarm is generated, data for prior calls charged to the billing number are sent to a fraud analyst, who analyzes that data and may determine whether or not to deactivate the card. If the decision is to deactivate the card, the '354 patent describes the analyst as setting a fraud flag.

While monitoring billing numbers and blocking those numbers displaying evidence of fraudulent usage is an important component of fraud prevention, no one technique in itself is sufficient to prevent fraudulent access. Perpetrators of fraud (also referred to herein as "hackers") are persistent and creative and are constantly developing new ways of evading fraud prevention mechanisms. In addition, there is a ready (and relatively inexpensive) supply of stolen billing numbers available to those who are so disposed to obtain and use them. Thus, the fraud detection and prevention techniques that focus on billing numbers, such as the '354 patent, may not be effective against hackers who have a supply of different billing numbers.

For example, a series of fraudulent calls may be made from a single originating ANI over time. One prominent example of this type of fraudulent activity is when an attempt is made to hack into a private PBX in order to access information or to use the PBX to make a subsequent call. In the latter case, the call to the PBX may be a local or domestic call, which is less likely to attract attention, whereas the subsequent call made from the PBX may be a costly international call. If such calls are made using different billing numbers, then the fraud will not be prevented based on fraud prevention techniques that rely on repeated use of a billing number.

Repeated calls to a PBX (or other terminating ANI) may be identified and blocked using certain methods that create alerts based on fraudulent calling patterns to the terminating ANI and, once identified, block or otherwise intercept subsequent special services calls to the terminating ANI. Such techniques may not be feasible for many terminating ANIs, however. For example, where the terminating ANI is a busy hospital, it may be unacceptable to block incoming calls under any circumstances, even if a fraud alert on the terminating ANI is generated.

Thus, it would be desirable to have a system and technique for identifying and blocking fraudulent calls made from an originating ANI where a number of different billing numbers are used to place the calls. So-called "back end" procedures for identifying fraudulent calling patterns from originating ANIs rely on analysis of calling records in batch and identifying unexpected billing patterns in light of the type of originating ANI. Such batch analysis, however, can be sporadic and typically occurs long after the fraudulent calling starts, for example, days, weeks or even months. This can allow the fraudulent activity to occur for lengthy periods before it is identified and prevented. It would therefore also be desirable to have a system and method for blocking such fraudulent calls that identifies potentially fraudulent calling patterns using up-front processing, i.e., is close in time to the beginning of the fraudulent calling activity.

SUMMARY OF THE INVENTION

It is an objective of the present invention to provide a method and system for detecting fraudulent calls made from an originating ANI. It is an objective of the present invention to have such detection take place through up-front processing. It is also an objective of the present invention to prevent further fraudulent calls from being made at the originating ANI.

In accordance with these objectives, one preferred embodiment of the present invention provides a method of identifying fraud in a telecommunications system. The method includes receiving data related to a current call placed from an originating ANI, where the received data includes the originating ANI, a billing number and an identification code. A threshold number and a time interval corresponding to the identification code for the originating ANI are retrieved, for example, from a memory. In addition, billing numbers for prior calls from the originating ANI, if any, and corresponding indicia of the times of the calls are retrieved. A determination is made of whether the number of billing numbers used for the current and prior calls from the originating ANI over a prior period of time equal to or less than the time interval exceeds the threshold number. If the threshold number is exceeded, a fraud alert is generated.

Another preferred embodiment of the invention is also a method of identifying fraud in a telecommunications system. The method includes receiving data related to a current call placed from an originating ANI, where the received data includes the originating ANI, a billing number and an identification code. The received data for the originating ANI is stored, for example, in a memory. The billing numbers and corresponding indicia of times of calls from the originating ANI and the identification code for the originating ANI are retrieved at an initiating event. (The initiating event may be the receipt of data related to the current call placed from the originating ANI, or the elapse of a period of time.) A threshold number and a time interval corresponding to the identification code for the originating ANI is also retrieved. A determination is made of whether the number of billing numbers used for calls from the originating ANI over a prior period of time equal to or less than the time interval exceeds the threshold number. If the threshold number is exceeded, a fraud alert is generated.

Another embodiment of the present invention is a system for identifying fraud in a telecommunications system. The system comprises at least one processor, memory and related software. The at least one processor receives data related to a current call placed from an originating ANI, where the received data includes at least the originating ANI, a billing number and an identification code. The processor retrieves a threshold number and a time interval corresponding to the identification code from the memory, and the processor also retrieves from memory billing numbers for prior calls from the originating ANI, if any, and an indicia of the times of the calls. The processor also determines whether the number of billing numbers used for the current and prior calls from the originating ANI over a prior period of time equal to or less than the time interval exceeds the threshold number. If the threshold number is exceeded, a fraud alert is generated.

In each of the above embodiments, the determination may be whether the number of billing numbers used from the originating ANI over a prior period of time equal to or less than the time interval equals or exceeds the threshold number. If the threshold number is met or exceeded, a fraud alert is generated.

Techniques of determining up-front whether the number of billing numbers used for calls from an originating ANI over a prior period of time exceeds a threshold corresponding to the type of originating ANI and generating a fraud alert if the threshold is exceeded will be referred to hereinbelow as fraud detection based on Call Attempt Velocity on an Originating ANI or number ("CAVO").

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
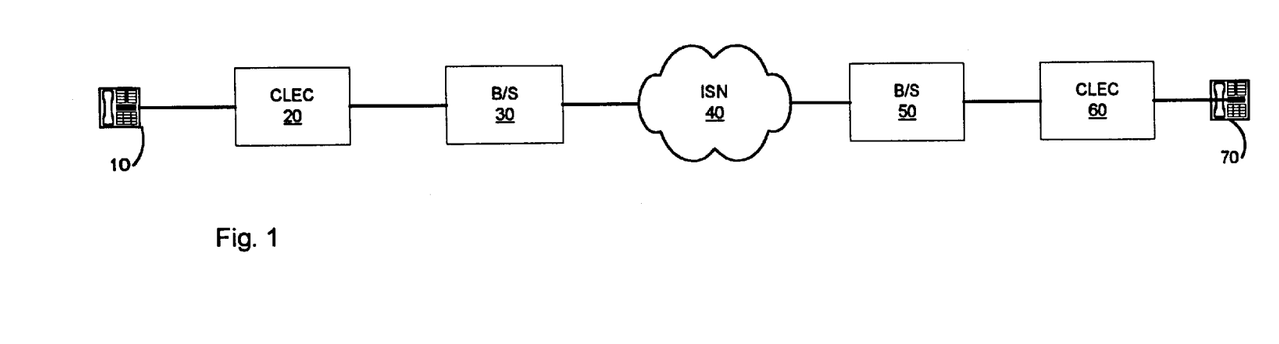
FIG. 1 is a block diagram of a telephone system that includes an intelligent services network (ISN)

Referring to FIG. 1, a representation of an underlying telephone system is shown which provides the context for the present invention. A call from an originating telephone 10 (also referred to as an originating automatic number indicator or originating ANI) is connected to an ISN 40 through a first competitive local exchange carrier 20 (CLEC) and a first bridge switch (B/S) 30. After processing, the ISN 40 routes the call to terminating telephone 70 (also referred to as an terminating automatic number indicator or terminating ANI) via a second B/S 50 and a second CLEC 60.

Figure 1A:
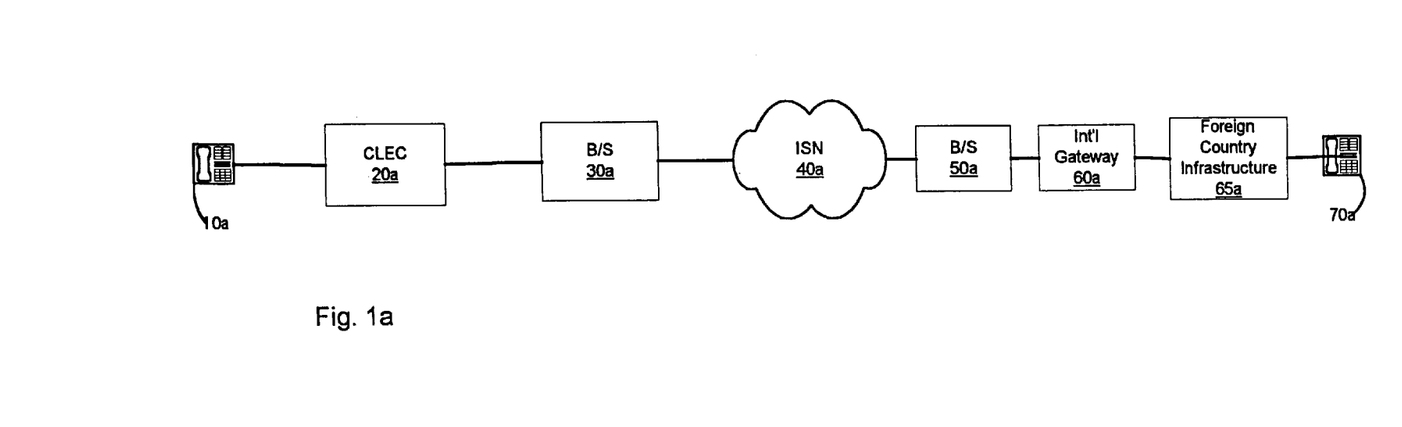
FIG. 1a is a block diagram of an alternative telephone system that includes an ISN.

Depending on where the call originates and terminates, additional or alternative infrastructure may support the connection between the originating ANI and the ISN and/or between the terminating ANI and the ISN. For example, as shown in FIG. 1a, if the call is made to a terminating ANI 70a in a foreign country, the call is routed from the ISN 40a to the terminating ANI 70a through B/S 50a, international gateway switching system 60a and the local switching infrastructure 65a of the foreign country. The foreign country infrastructure 65a can be comprised of a number of regional and local carriers.

An example of fraudulent calling for the system of FIG. 1 would be a hacker at the originating ANI 10 placing multiple calls to a PBX at the terminating ANI 70. The calls may be special service calls through the ISN 40 (discussed further below) using a multiplicity of different billing numbers. An example of fraudulent calling for the system of FIG. 1a would be a hacker at the originating ANI 10a placing multiple calls to one or more foreign terminating ANIs 70a. Again, the calls may be special services calls made through the ISN using a multiplicity of different billing numbers.

The supporting connections for a call that is placed using the ISN platform are billed to the company that owns and/or operates the ISN (referred to as the "telecommunications company"). Referring back to FIG. 1, the connection charges of CLEC 20, B/S 30, B/S 50 and CLEC 60 are the responsibility of the telecommunications company. Similarly, the telecommunications company is responsible for the connection charges shown in FIG. 1a, including the international gateway connection 60a and the connections 65a made in the foreign country by foreign carriers. Thus, the costs of the frauds to the telecommunications company given in the above examples may be significant. In addition, if the fraudulent caller is successful in hacking into a PBX, the PBX may be used to place subsequent fraudulent calls.

As noted, the originating ANI is generally associated with a CLEC (such as the CLEC 20, 20a shown in FIGS. 1 and 1a, respectively), not the telecommunications company which operates the ISN. However, when a call is placed at an originating ANI, an "information digit" is generally supplied by the CLEC that identifies the type of originating ANI. The industry standard of information digits in the U.S. are the Bell Core information digits supplied by CLECs. For example, a coin-operated payphone originating ANI may have an information digit "27", a coinless payphone originating ANI may have an information digit "7" and a cellular telephone may have an information digit "61". The "information digit" identifying the type of originating ANI will alternatively be referred to herein as an "identification code". (As seen, the "information digit" can actually comprise multiple digits.)

Figure 2:
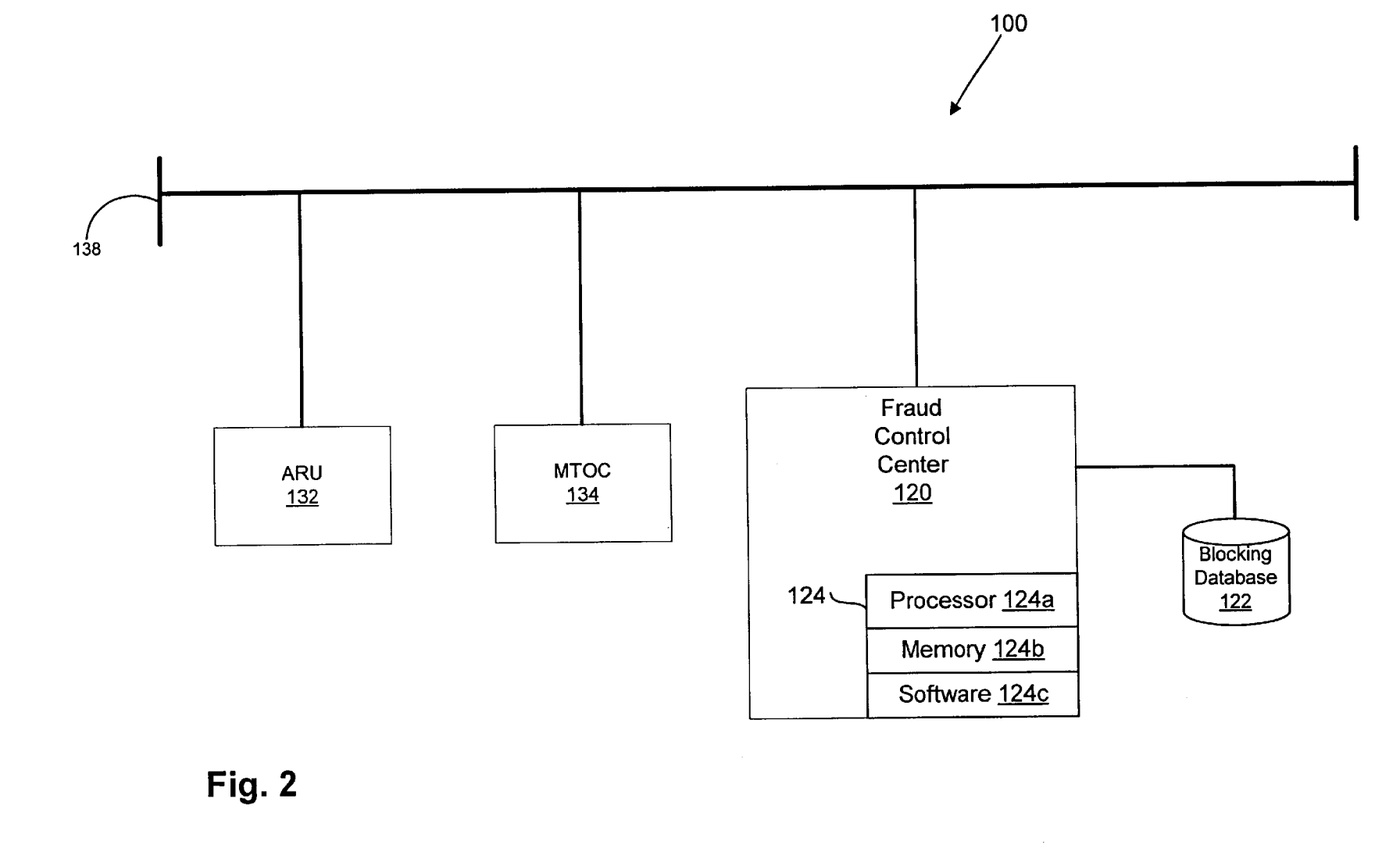
FIG. 2 is a block diagram of a preferred embodiment of the present invention as supported by the infrastructure of an ISN.

FIG. 2 represents components that support a preferred embodiment of a system of the present invention. The components 100 shown in FIG. 2 are part of a larger ISN platform, such as the ISN platforms 40, 40a represented in FIGS. 1 and 1a. The components 100 are comprised of a fraud control center 120 and associated blocking database 122, an automatic response unit (ARU) 132, and a manual telecommunications operator console (MTOC) 134 that preferably interface via an ethernet rail 138. A special service call is received by the ISN via the ARU 132 or the MTOC 134. Thus, for example, a call placed at originating ANI 10 of CLEC 20 shown in FIG. 1 may be connected from the B/S 30 to the ISN 40 via the ARU 132 or the MTOC 134 shown in FIG. 2.

As previously noted, calls that require special services generally require the caller to manually supply a portable billing number (such as a credit card, calling card, pre-paid phone card, supplying a home phone number for a third party call, etc.), such as by pressing numbers on a payphone, swiping the magnetic strip on a card or speaking with an operator. Special services of an ISN are typically accessed by a toll free or special access number, such as, for example, MCI WorldCom's (800) 888-8000 access number. As also previously noted, a special services call received through the ARU 132 or the MTOC 134 will also include an identification code (information digit) from the CLEC 20 identifying the type of originating ANI 10.

Fraud control center 120 includes a system 124 that directly supports an embodiment of the present invention. In general, the system 124 comprises at least one computer (or processor) 124a, memory 124b and processing software 124c. The system may reside anywhere along ethernet rail 138 but is typically located in a fraud control facility, such as fraud control center 120.

System 124 generates fraud alerts based on suspect calling patterns from the same originating ANI. Processor 124a receives data for special services calls received via the ARU 132 or MTOC 134. The data received includes the originating ANI, the identification code and the billing number. The computer 124a processes the calling data using the software 124c and, for each call, creates a calling record in the memory 124b. The calling record is referenced (or addressed) in the memory 124b by the originating ANI and also includes the billing number and the time of the call. It may also include the identification code.

When a call is placed from the originating ANI using the special services platform (i.e., is received via the ARU 132 or MTOC 134), data for the call is forwarded to the processor 124a via ethernet rail 138. The prior calling records created and stored in memory 124b for the originating ANI are retrieved by the processor 124a and evaluated, along with the current call, using the software 124c. If the software 124c indicates that the pattern of calling from the originating ANI is consistent with fraudulent activity, an alert is generated.

For example, if the originating ANI is a cellular telephone, a fraudulent pattern of calling may be indicated by special services calls placed using two or more distinct billing numbers within a one hour interval, since this is not normal calling activity for a cellular telephone. As a particular example, the processor 124a may receive data for a current call indicating that the originating ANI is (516) 555-1313, the originating ANI has identification code 61 (indicating a cellular telephone) and the call is a special services call made (via ARU 132 or MTOC 134) using a billing number 1234-1234-1234-1234. The identification code is used by the processor to retrieve a stored threshold number and time interval corresponding to the type of originating ANI. For the code 61, for example, the processor consults a look-up table in memory 124b and retrieves a threshold of 2 for an interval of one hour. (This represents the threshold of 2 billing numbers over a one hour interval for calls from a cellular phone, as noted above). In addition to this data for the current call, the processor 124a retrieves calling records for originating ANI (516) 555-1313 from memory 134b, which includes the billing numbers used for prior calls from the originating ANI and the times of those calls. If this data for the current and past calls from the originating ANI shows that the threshold has been exceeded for the interval of time, namely whether two or more different billing numbers have been used for calls within an hour, an alert is generated for the originating ANI. If not, then a calling record is created for the current call and stored in the memory 124b. (A calling record may be created for the current call even if an alert is generated.)

It would be typical to see a larger number of special services calls placed on different billing numbers over the course of an hour or two from a coin operated payphone. These phones are often located in public places or facilities and are available to large, transient populations. In addition, it is expected that a significant percentage of people using a public phone will use a portable billing product, such as a credit card, calling card, or pre-paid calling card, rather than using coins. For a coinless payphone, a larger percentage of people would use a portable billing product, since money is not an option. However, coinless payphones may be located in areas (such as hotels) that have a smaller number of calls over the same period of time than a coin operated payphone.

Special services calls placed from coin operated payphone originating ANIs, coinless payphone originating ANIs and other types of originating ANIs may generally be processed in the same manner of the cellular telephone example described above. The threshold number of different billing numbers which will generate a fraud alert is adjusted to conform to the calling activity expected at the type of originating ANI. In addition, the interval of time may be adjusted.

For example, for calls placed from an originating ANI that is a coin operated telephone, a fraudulent pattern of calling may be indicated by special services calls placed within two hours using twenty or more distinct billing numbers. As described above, the processor 124a may receive data for a current call indicating that the originating ANI is (516) 555-1414, the originating ANI has identification code 27 (indicating a coin operated payphone) and the call is a special services call made using billing number 1234-1234-1234-1234. Using the identification code 27, the processor retrieves a threshold number 20 for an interval of two hours from a look-up table. (This represents the threshold of twenty different billing numbers over a two hour period noted above). The processor 124a then retrieves calling records for originating ANI (516) 555-1414 from memory 134b, which includes the billing numbers and times of prior calls from the originating ANI. The data for the current call and the calling records for prior calls are evaluated to determine if the threshold has been exceeded over the time interval, namely whether twenty or more different billing numbers have been used to make calls from the originating ANI within a two hour interval. If so, an alert is generated for the originating ANI. If not, then a calling record is created for the current call and stored in the memory 124b. (As noted, a calling record may be created for a current call even if an alert is generated.)

It may be noted that the example given above for the coin operated payphone of twenty calls using different billing numbers of a two hour period is not necessarily equivalent to ten such calls over a one hour period. Experience with calling patterns for particular types of phones may show that calling activity may intensify for a brief period, but be more uniform over a longer interval. Thus, during the peak hour of a rush-hour period in a train station, more than ten calls using different billing numbers may be made from a coin operated payphone. Setting a threshold of ten different billing numbers over one hour may thus routinely generate alerts that do not reflect fraudulent calling patterns from the originating ANI. Thus, the longer interval may be used so that false alerts are not generated.

The processing of calls made from an originating ANI that is a coinless payphone (e.g., identification code 7) may be processed in like manner described above for the cellular phone and coin operated payphone examples. The threshold number of calls placed using different billing numbers and/or the time interval used in the determination may be adjusted in the look-up table (or other storage format) to reflect the different type of originating ANI.

Figure 3:
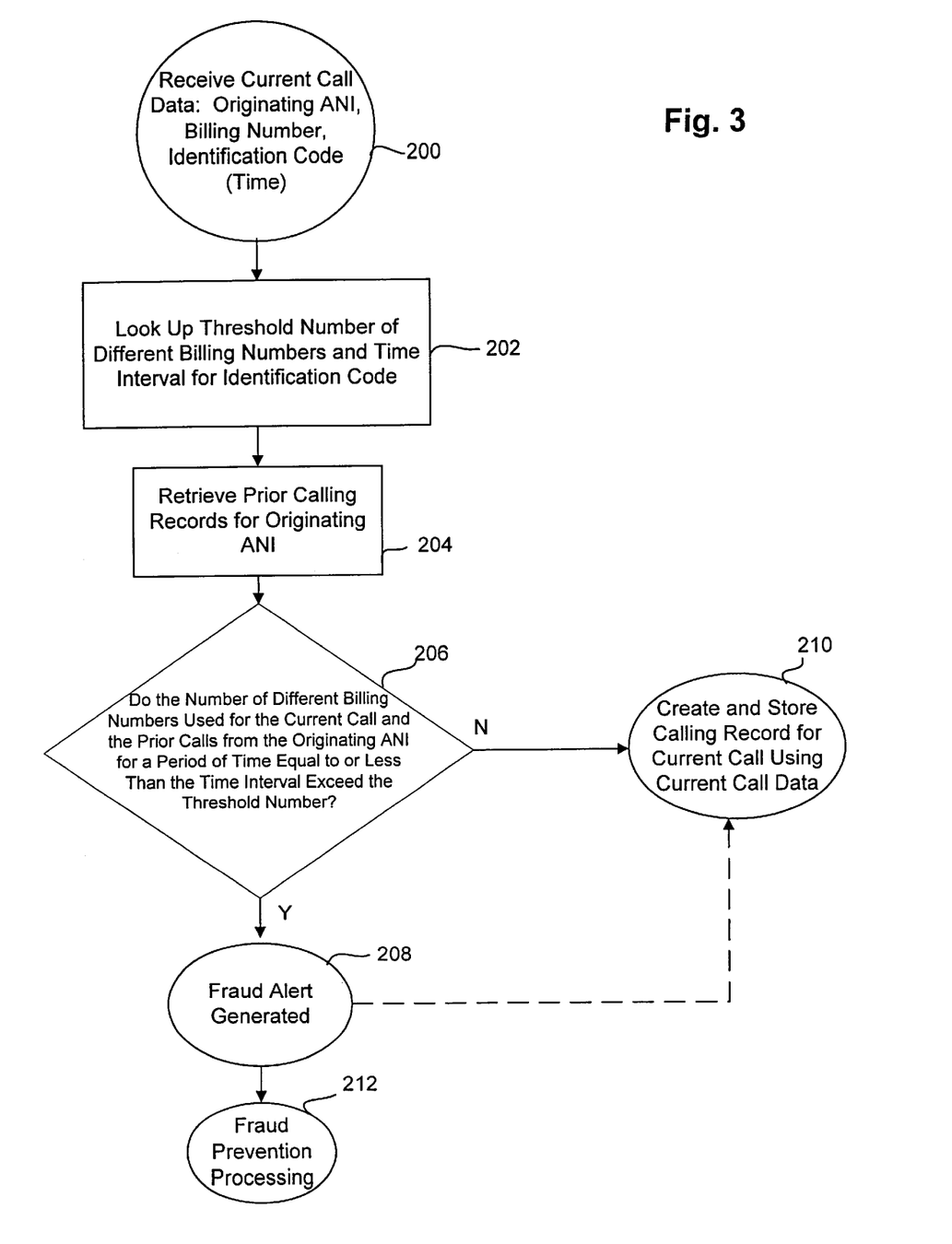
FIG. 3 is a flow chart of the processing of a preferred embodiment of the present invention.

FIG. 3 gives a flowchart of general procedures performed by the system 124 in carrying out the embodiment of the invention exemplified for the particular originating ANIs above. In step 200, the processor 124a receives data for a special services call currently being made from an originating ANI. The data includes the originating ANI, the identification code for the originating ANI and the billing number used for the call. The time of the call is also received or may alternatively be assigned as the time of receipt of data for the current call by the system 124. The processor 124a looks up a threshold number and a time interval using the identification code for the originating ANI (step 202). This represents the threshold number of different billing numbers used for calls over the time interval that indicates a fraudulent calling pattern for the type of originating ANI. In step 204, processor 124a retrieves calling records (if any) for the originating ANI from memory 124b. Each calling record for the originating ANI includes at least the time of a prior call (or, equivalently, elapsed time since the call) and the billing number used for the prior call.

The billing number for the current call and the billing numbers for prior calls, and the times of those calls are evaluated to determine if the threshold number has been exceeded over the time interval (step 206). Thus, the number of different billing numbers used for the current and prior calls from the originating ANI are counted for a prior period of time equal to or less than the time interval. If the number of different billing numbers exceeds the threshold, a fraud alert is generated (step 208). A fraud alert initiates fraud prevention processing (step 212), described further below.

If the number of different billing numbers does not exceed the threshold, then a call record for the current call is created (step 210), which includes the originating ANI, the billing number and the time of the call. A call record may also be created for the current call even if a fraud alert is generated in step 208, as indicated by the dashed line from step 208 to step 210.

It is noted that other sequences of steps may be used in FIG. 3. For example, step 204 may be performed before step 202. In addition, a calling record for the current call may be created and stored (shown in step 210) after any of steps 200, 202 and 204.

As noted, if a fraud alert is generated in step 208, fraud prevention processing is initiated in step 212. The processing related to fraud prevention may include sending the calling data for the originating ANI to a fraud analyst for further consideration. The fraud analyst may determine whether to block or intercept future calls from the originating ANI. Alternatively, further special services calls from the originating ANI may be immediately blocked. Blocking calls from the originating ANI may be accomplished by storing the originating ANI in a blocking database, such as blocking database 122 shown in FIG. 2. Before a special service call received via the ARU 132 or MTOC 134 is connected, the blocking database 122 is checked to see whether the originating ANI for the call is included therein. (Blocking database 122 is depicted in FIG. 2 as interfacing with fraud control center 120 because it may be located in the same physical facility as fraud control center 120. However, the ARU 132 and the MTOC 134 may access the blocking database 122 as if it were connected directly to the ethernet rail 138.) If the originating ANI is found in the blocking database 122, the call is not connected.

Referring back to FIG. 3, it was noted that, even if a fraud alert is generated in step 208, a calling record may be created and stored for the current call. Such a calling record may be created even where a fraud alert is generated because, for example, a fraud analyst may elect not to block the originating ANI based on the present calling pattern. Thus, the calling record for the current call may be used to evaluate future calls from the originating ANI for potentially fraudulent calling patterns.

EXAMPLE

Call attempt thresholds for originating ANIs are set for coinless payphones (identification code 7), coin operated payphones (identification code 27) and cellular telephones (identification code 61) as follows:

| Identification Code | Number of Different Billing Numbers Used for Calls | Time Interval |
| --- | --- | --- |
| 7 | 2 | 10 minutes |
| 27 | 3 | 10 minutes |
| 61 | 2 | 10 minutes |

The following calls are made between 4:00 and 4:09 p.m. and reflected in calling records of the system:

| Time | Originating ANI | Billing No. | Id. Code | Terminating ANI |
| --- | --- | --- | --- | --- |
| 4:00 | 303-390-9111 | 2123451234 | 27 | 442-12938-1909 |
| 4:01 | 303-390-2345 | 218345123423455 |  | 822-12938-1909 |
| 4:01 | 303-390-9111 | 718345123453564 | 27 | 61-12938-1909 |
| 4:02 | 303-390-1111 | 73625910398756 | 7 | 44-12938-1909 |
| 4:03 | 303-390-1111 | 17284759738547 | 7 | 54-12938-1909 |
| 4:04 | 303-390-9111 | 3283451234 | 27 | 7-12938-1909 |
| 4:04 | 303-390-6076 | 38756982934084 | 61 | 45-12938-1909 |
| 4:05 | 303-390-6082 | 2133451234 | 27 | 46-12938-1909 |
| 4:06 | 303-390-6082 | 27374829505858 | 27 | 20-12938-1909 |
| 4:07 | 303-390-6045 | 28374859505858 |  | 81-12938-1909 |
| 4:08 | 303-390-6082 | 61834512341234 | 27 | 593-12938-1909 |
| 4:09 | 303-390-9111 | 33334512341234 | 27 | 504-12938-1909 |

For the originating ANI 303-390-9111, with identification code 27 (a coin operated payphone), the above calling records show more than three calls using different billing numbers within 10 minutes. That is, billing number 2123451234 was used at 4:00 p.m., billing number 718345123453564 was used at 4:01 p.m., billing number 3283451234 was used at 4:04 p.m. and billing number 33334512341234 was used at 4:09 p.m. Since the threshold for identification code 27 is three different billing numbers for calls within a ten minute interval, a fraud alert is tripped for originating ANI 303-390-9111. In fact, any one of the calls from originating ANI 303-390-9111 could be eliminated and a fraud alert would still be generated.

A fraud alert is also generated for originating ANI 303-390-6082, having identification code 27, since three different billing numbers were used for calls made from this originating ANI at 4:05, 4:06 and 4:08 p.m.

Finally, a fraud alert is generated for originating ANI 303-390-1111, having identification code 7 for a coinless payphone. Two different billing numbers were used for calls from this originating ANI between 4:00 and 4:09 p.m. (that is, billing number 73625910398756 at 4:02 p.m. and billing number 17284759738547 at 4:03 p.m.) Since the threshold number of different billing numbers for calls from a coinless payphone is two over a time interval of ten minutes, a fraud alert is thus generated.

It is noted that no fraud alert is generated in the above example for the cellular telephone having originating ANI 303-390-6076 since only one billing number was used in the ten minute interval. The threshold for a cellular phone (identification code 61) in the above table is 2 billing numbers over a ten minute period.

The example immediately above shows that the processing of the present invention need not necessarily be made at the time a call is received from an originating ANI. Calling records for calls from originating ANIs may be accumulated (via calling records) and then processed. The processing may occur periodically, such as every ten minutes. The processing of accumulated calling records would include separating or selecting calling records for each originating ANI. From each group of records corresponding to an originating ANI, the number of different billing numbers used for calls over a time interval would be evaluated against the threshold number and time interval corresponding to the type of originating ANI (as determined by the identification code). Fraud alerts would be generated for each originating ANI showing calls made with a number of different billing numbers that exceeded the threshold over a period of time equal to (or less than) the time interval for the type of originating ANI, as in the above example.

As noted, processing would occur periodically and such periods would be relatively short. Periods of ten minutes were noted in the above example and, generally, the periods would not exceed one or two hours. Such short periods provide the up-front processing needed to identify fraudulent patterns close to the time they are initiated and to avoid long periods of fraudulent calling without identification and prevention.

In the embodiment where the processing is initiated when a call is received from an originating ANI, as in FIG. 3 and the related text above, the calling records for prior calls need not include the identification code because it is known from data received for the current call. Where calling records are accumulated for many originating ANIs and then processed, as in the example immediately above, there is no current call pending that identifies the originating ANI. Thus, the stored calling records will include the identification code for the originating ANI, so that the pertinent threshold and time interval may be retrieved from memory when the processing subsequently takes place.

In addition, the example immediately above shows that other information may be included in the calling records, such as the terminating ANI for the call. This data may be used in other types of fraud analysis. The example immediately above also shows that the fraud alert may be generated if the number of different billing numbers used in the time interval meets or exceeds the threshold.

In another preferred embodiment of the invention, data related to the current call request is forwarded by the telecommunications company to the company that issues the billing number (the "billing product company"). The billing product company may be, for example, a credit card company such as American Express. The billing product company may have a system for identifying fraud analogous to the embodiments described above and may include, for example, a processor, memory and related software. The data related to the current call request may include the originating ANI and a billing number. It may optionally include the identification code for the originating ANI. The processor retrieves from memory billing numbers for prior calls from the originating ANI, if any, and an indicia of the time of the call. The billing numbers for prior calls from the originating ANI are also billing numbers issued by the billing product company. The processor determines whether the number of billing numbers used for the current and prior calls from the originating ANI over a prior time interval exceeds a threshold number. A fraud alert is generated if the threshold number is exceeded.

The prior time interval and the threshold may or may not be a function of the type of originating ANI. The billing product company may desire to set its threshold and time intervals at certain levels regardless of the type of originating ANI. For example, if a credit card company observes a number of its billing numbers incurring charges via an originating ANI over a short period of time, it may choose not to approve any further charges on its billing numbers from that originating ANI, regardless of the type of originating ANI. Alternatively, the credit card company may set its thresholds and time intervals according to the type of originating ANI.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A system for identifying fraud in a telecommunications system, the system comprising at least one processor, memory and related software, the at least one processor receiving data related to a current call placed from an originating automatic number indicator (ANI), the received data including at least the originating ANI, a billing number and an identification code, the processor retrieving a threshold number and a time interval corresponding to the identification code from the memory, the processor also retrieving from memory billing numbers for prior calls from the originating ANI, if any, and an indicia of the time of the call, and the processor also determining whether the number of different billing numbers used for the current and prior calls from the originating ANI over a prior period of time equal to or less than the time interval exceeds the threshold number, wherein the prior period of time spans from the time of the current call backwards in time equal to the time interval for the identification code, the processor counting the number of different billing numbers for the current call and all prior calls for the originating ANI that fall within the prior period of time, a fraud alert being generated if the threshold number is exceeded.

2. The system as in claim 1, wherein the billing numbers and indicia of time for prior calls for the originating ANI are included in calling records stored in the memory, each calling record containing data for one prior call from the originating ANI, the calling record referenced by originating ANI and including the billing number used for the call and an indicia of the time of the call.

3. The system as in claim 2, wherein a calling record is created for the current call.

4. The system as in claim 1, wherein threshold number of different billing numbers and the time interval corresponding to the identification code is included in a look-up table stored in the memory.

5. The system as in claim 1, wherein data related to the current call is received by the at least one processor from components that receive and process special services calls.

6. The system as in claim 1, wherein the processor also determines whether the number of billing numbers used for current and prior calls from the originating ANI over a prior period of time equal to or less than the time interval equals the threshold number and a fraud alert is also generated if the threshold number is met.

7. A method of identifying fraud in a telecommunications system, the method comprising the steps of a) receiving data related to a current call placed from an originating ANI, the received data including the originating ANI, a billing number and an identification code;

b) retrieving a threshold number and a time interval corresponding to the identification code for originating ANI;

c) retrieving billing numbers for prior calls from the originating ANI, if any, and corresponding indicia of the times of the calls;

d) determining whether the number of different billing numbers used for the current and prior calls from the originating ANI over a prior period of time equal to or less than the time interval exceeds the threshold; counting the number of different billing numbers for the current call and all prior calls for the originating ANI spanning from the time of the current call backwards in time equal to the time interval for the identification code; comparing the count of different billing numbers with the threshold number for the identification code; and e) generating a fraud alert if the threshold number is exceeded.

8. The method as in claim 7, wherein the billing numbers and indicia of time for prior calls for the originating ANI are retrieved from stored calling records, each calling record containing data for one prior call from the originating ANI, the calling record referenced by originating ANI and including the billing number used for the call and an indicia of the time of the call.

9. The method as in claim 8, the method including the additional step of creating a calling record for the current call and storing the calling record, the calling record including the originating ANI, the billing number and an indicia of the time of the call, the calling record referenced in the memory by the originating ANI.

10. The method as in claim 7, wherein the step of retrieving billing numbers for prior calls from the originating ANI, if any, and corresponding indicia of the times of the calls includes retrieving an identification code of the originating ANI.

11. The method as in claim 7, wherein the received identification code is a Bell Core information digit corresponding to the originating ANI.

12. The method as in claim 7, wherein the generation of a fraud alert initiates processing related to prevention of fraudulent calling from the originating ANI.

13. The method as in claim 7, wherein the step of determining whether the number of different billing numbers used for current and prior calls from the originating ANI over a prior period of time equal to or less than the time interval exceeds the threshold number includes determining whether the number of billing numbers equals the threshold number and the step of generating a fraud alert if the threshold number is exceeded includes generating a fraud alert if the threshold number is met.

14. A method of identifying fraud in a telecommunications system, the method comprising the steps of:

a) receiving data related to a current call placed from an originating ANI, the received data including the originating ANI, a billing number and an identification code;

b) storing the received data for the originating ANI;

c) at an initiating event, retrieving the billing numbers and corresponding indicia of times of calls from the originating ANI and the identification code for the originating ANI;

d) retrieving a threshold number and a time interval corresponding to the identification code for the originating ANI;

e) determining whether the number of different billing numbers used for calls from the originating ANI over a prior period of time equal to or less than the time interval exceeds the threshold number; counting the number of different billing numbers for the current call and all prior calls for the originating ANI spanning from the time of the current call backwards in time equal to the time interval for the identification code; and f) generating a fraud alert if the threshold number is exceeded.

15. The method as in claim 14, wherein the initiating event is the receipt of data related to the current call placed from the originating ANI.

16. The method as in claim 14, wherein the initiating event is the elapse of a period of time.

17. The method as in claim 14, wherein the step of determining whether the number of different billing numbers used for calls from the originating ANI over a prior period of time equal to or less than the time interval exceeds the threshold number includes determining whether the number of different billing numbers equals the threshold number and the step of generating a fraud alert if the threshold number is exceeded includes generating a fraud alert if the threshold number is met.

18. A system for identifying fraud, the system comprising at least one processor, memory and related software, the at least one processor receiving data related to a current call request placed from an originating ANI, the received data including at least the originating ANI and a billing number, the processor retrieving from memory billing numbers for prior calls from the originating ANI, if any, and an indicia of the time of the call, and the processor also determining whether the number of different billing numbers used for the current and prior calls from the originating ANI over a prior period of time equal to or less than a time interval exceeds a threshold number, wherein the prior period of time spans from the time of the current call backwards in time equal to the time interval for the identification code, a fraud alert being generated if the threshold number is exceeded.

19. The system as in claim 18, wherein the system is operated by a billing product company and the data related to the current call request is received from a telecommunications company.

20. The system as in claim 18, wherein the billing number included in the data related to the current call is a billing number for a billing product issued by the billing card company.

21. The system as in claim 18, wherein the processor also determines whether the number of different billing numbers used for current and prior calls from the originating ANI over a prior period of time equal to or less than the time interval equals the threshold number and a fraud alert is also generated if the threshold number is met.

22. A method of detecting fraud in a telecommunications system, the method comprising:

receiving data related to a current call placed from an originating telephone number, the data specifying a billing number and an identification code, wherein the identification code is associated with a threshold number and a time interval;

counting the number of different billing numbers for the current call and prior calls for the originating telephone number spanning from the time of the current call back to a time based on the time interval for the identification code;

comparing the count of different billing numbers with the threshold number for the identification code; and generating a fraud alert if the threshold number is exceeded.

* * * * *